Figure 2:
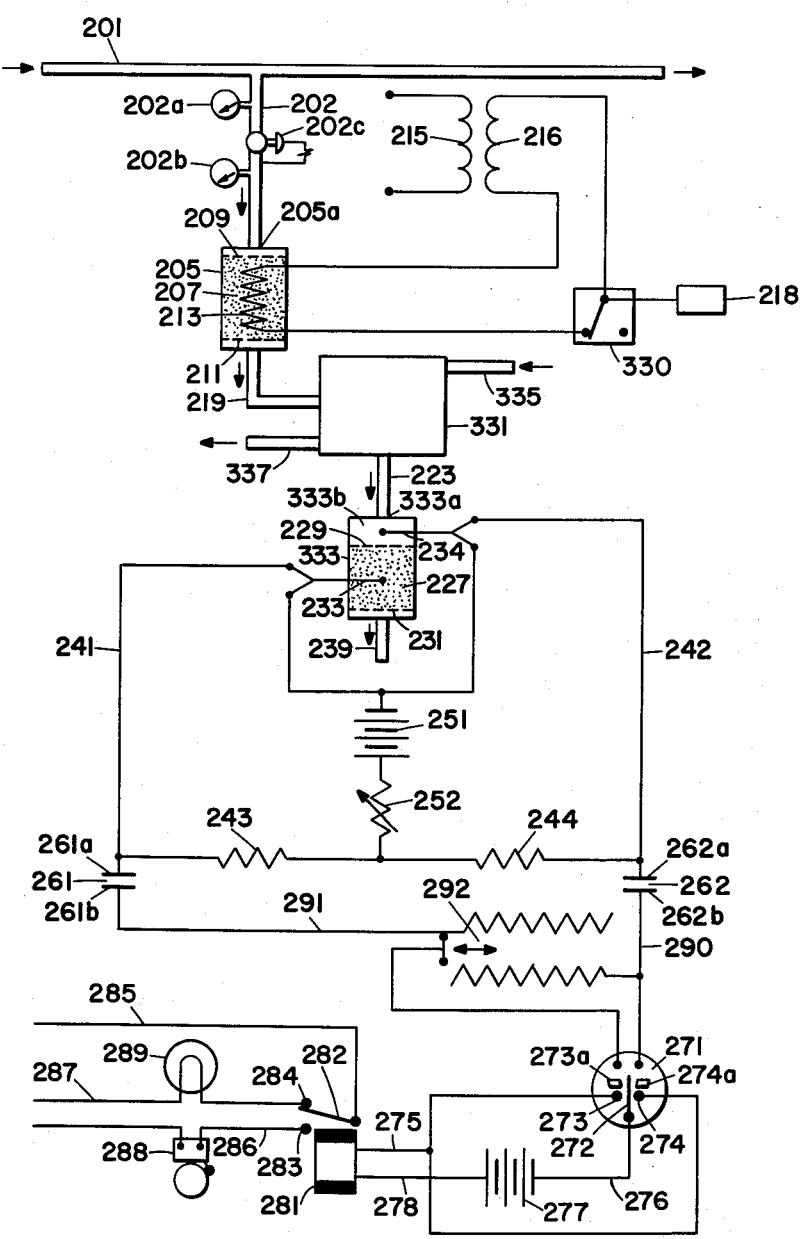

Charles W. Skarstrom  Inventor

Charles W. Skarstrom Inventor

By ⟨signature⟩ Attorney

United States Patent Office 3,011,335
Patented Dec. 5, 1961

3,011,335
APPARATUS FOR ANALYZING MIXTURES
OF GASEOUS MATERIALS
Charles W. Skarstrom, Montvale, N.J., assignor to Esso Research and Engineering Company, a corporation of Delaware
Filed July 1, 1958, Ser. No. 746,049
2 Claims. (Cl. 73—26)

The present invention relates to apparatus for analyzing mixtures of gases. More particularly, the invention relates to apparatus for determining the concentration of a certain component or components of a mixture of gases. The invention is particularly adapted to such determinations when the subject component or components may be present in a mixture in comparatively small amounts. The invention further relates to apparatus for accomplishing such determinations wherein the concentration of such component or components present in a sample stream is modified cyclically to increase and decrease the concentration thereof in such stream as supplied to a detector for the component or components. Still further, the invention relates to apparatus including a detector system responsive to modification of the sample stream supplied thereto to produce an oscillating signal wherein the magnitude of oscillation is substantially proportional to the amount of the component or components determined and present in the initial flow stream.

In various industrial processes and manufacturing operations, it is frequently imperative to know when the concentration of one or more components of a process stream varies from a preselected limit of concentration. In this application the component or components to be determined are designated by the term "key component" or "key component portion." Specific examples of such key components might be water vapor as present in air or in a refinery gas stream, isobutane as contained in a mixture of n-butane and iso- and n-pentane, or propane in air. Primarily, the invention relates to the determination of one component of a mixture such as water vapor in air, but in certain circumstances may relate to the determination of total concentration of two or more key components of a sample stream, such as water vapor and carbon dioxide in the sample stream. As used in the following description of the invention, the term "gas" is intended to include not only those materials conventionally considered to be gases but also those materials conventionally considered to be vapors.

It is an object of the present invention to provide apparatus for detecting the presence and concentration of a key component in a gas mixture sample stream, wherein the stream is passed to a detector for the key component through an adsorption zone adapted to retain the key component, while cyclically varying the temperature of the zone within a predetermined range, whereby retention of the key component in the zone is varied correspondingly, and whereby the concentration of the key component in the sample stream as supplied to a detector also is correspondingly varied, and the signal output of the detector is thus modified to produce a proportional signal amplitude fluctuation. It is also an object of the present invention to provide a bridged electrical signal circuit wherein only the cycling component of the signal input thereto is transmitted for evaluation and determination of the key component concentration of a sample stream. It is a further object of the present invention to provide a detector system wherein temperature cycles are employed to modulate the concentration of a key component present in an initial sample flow stream whereby cyclically to increase and decrease such concentration in the sample stream supplied to the detector system. It is a still further object of the present invention to provide a simple and rugged apparatus, whereby the desired determinations, usually requiring extremely delicate instrumentation, operated under closely controlled laboratory conditions, may now be accomplished under field conditions of environment and operation.

Figure 1:
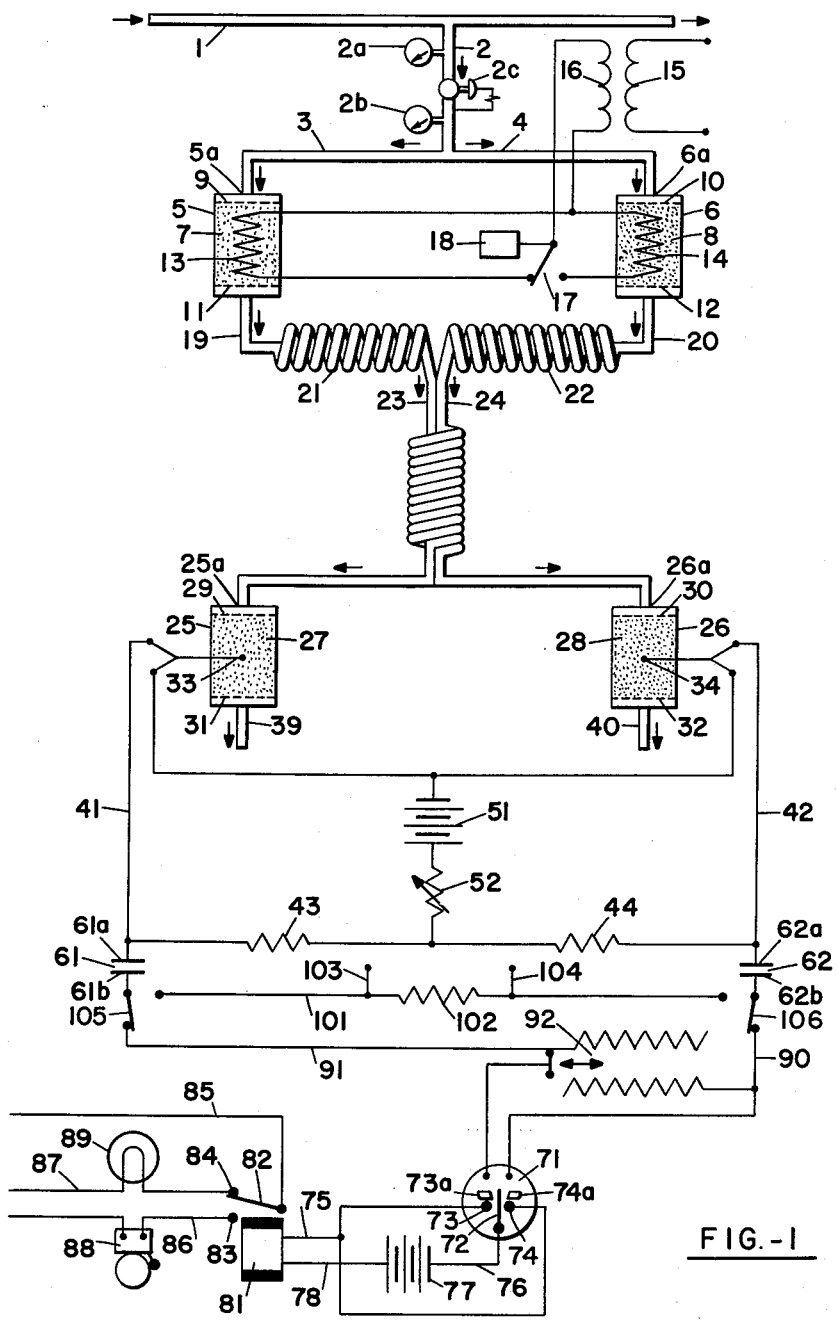

The invention and its objects may be more fully understood from the following specification when it is read in conjunction with the accompanying drawings in which:

FIG. 1 is a diagrammatic illustration of a simple form of the apparatus, showing means for modifying the composition of the initial sample stream, and a key component detector system including a signal transmission circuit according to the present invention; and FIG. 2 is a diagrammatic illustration of a modified form of the apparatus such as shown in FIG. 1, wherein the dual modulation and detector system is replaced by single modulation and detection means.

Referring now in greater detail to the drawings in FIG. 1, the numeral 1 designates a conduit for a gas flow stream. This flow stream may be the main stream or a portion drawn from a main stream as a representative portion thereof. A conduit connection 2 communicates at one end with the conduit 1 and at the other end with branch conduits 3 and 4, respectively. In the drawing, the numerals 2a and 2b designate pressure gauges communicating with the conduit 2 upstream and downstream, respectively, from a pressure control valve 2c in the conduit 2.

Each of the branch conduits 3 and 4 communicates with a separate adsorber zone or chamber, the branch conduit 3 with the inlet 5a of adsorber 5 and the branch conduit 4 with inlet 6a of adsorber 6. In a preferred form of the apparatus, each adsorber chamber is substantially filled with a body of an adsorbent packing material, designated in the drawings by the numerals 7 and 8, respectively. The adsorbent material selected for this purpose depends upon the nature of the key component fraction to be monitored. The adsorbent must be selective for at least such component fraction. In monitoring water vapor in air, for example, a suitable adsorbent would be silica gel (20–40 mesh size). Other adsorbents, having selective adsorptive characteristics for one or more key component fractions of a gaseous mixture, may be selected from such materials as activated carbon, alumina, glass wool, absorbent cotton, etc. As indicated, the choice of an adsorbent primarily depends upon the nature of the gas mixture and the affinity of the adsorbent for a particular component fraction or fractions to be monitored.

It is also preferred that the adsorbent packing, such as designated by the numerals 7 and 8, be disposed within the containing chamber so as to be supported in spaced relation to the ends of the chamber, thereby providing for better distribution of the incoming gas sample and for discharge of an effluent with a minimum of canalization through the body of adsorbent material. As represented in the drawings, this may be accomplished by retaining the adsorbent material between upper and lower perforated plates designated in the chamber 5 by the numerals 9 and 11, respectively, and in the chamber 8 by the numerals 10 and 12, respectively. Each of these retainer plates is disposed in longitudinally spaced relation to the respective upper and lower end portions of the chamber with which associated. Alternatively, the adsorbent material may be contained in a cartridge, having perforated endwall portions, the cartridge being adapted for insertion in the adsorber chambers 5 and 6. Also as represented in the drawing, each chamber is provided with a heater element adapted for submergence in the body of adsorbent contained between the upper and lower plates in each chamber. In the drawing, the numerals 13 and 14 designate the heater elements provided for the representative chambers 5 and 6. The respective heater elements are connected in parallel in an electrical heater circuit which, as shown, includes a transformer having a primary coil 15 adapted for connection to a current source, and a secondary coil 16 connected in the circuit through a double throw switch mechanism 17, whereby current may be supplied alternately to each of the heater elements 13 and 14 in the circuit. Preferably, the double throw switch is cyclically operable as by means of a timing mechanism such as represented in the drawing and designated by the numeral 18.

Other means for heating the beds 7 and 8 may be substituted for the heaters 13 and 14. Also, heating elements as represented by elements 13 and 14 may be disposed otherwise than as illustrated. For example, if a heater element is disposed in or about the conduits 3 and 4, respectively, the gas streams passed through these conduits may be heated, and the respective beds 7 and 8 thus heated by passage of the heated gas streams therethrough. The object to be attained, in any event, being to produce uniform and rapid heating of the entire bed in the shortest time possible.

The chambers 5 and 6 also are provided with outlets 19 and 20, respectively, communicating at one end with one of the chambers and at the other end connected and communicating with a conduit portion such as designated in the drawings by the numerals 21 and 22, respectively. The conduit portions 21 and 22 are shown as coils adapted to provide for indirect heat exchange between a flow stream therethrough and the ambient atmosphere. In this description, therefore, these conduit portions may be referred to as primary heat exchange coils, sections, or portions. While shown and described as providing heat exchange with the ambient atmosphere, they may also include provision for establishing a heat exchange relatiosnhip between the coils and any other heat exchange fluid circulated around them. The outlet end of the coil 21 connects and communicates with the inlet end of a capillary tube section 23 while the outlet end of the coil 22 connects and communicates with the inlet end of a capillary tube 24. As shown in the drawing, these tubes are preferably coiled on a common axis with the coils of one tube interposed between the coils of the other tube in such fashion as to provide intimate tangential contact between the wall portions of the respective tubes. Also, for the purpose of improved contact relationship of the coils, it is preferred that they be soldered one to another. In this fashion, the capillary tubes provide a bifilar flow control and heat exchange unit wherein the constancy and uniformity of flow through the respective tube is substantially maintained by virtue of their capillary dimensions, and heat exchange by virtue of the indirect heat exchange relation between the respective flow streams within the tubes. Any initial difference between the temperatures of the streams at the inlets of the respective tubes tends to be modified to produce relative uniformity at the outlets of the tubes. For the purpose of the present description, the respective capillary tubes may be designated as secondary heat exchange coils, sections, or portions of the conduit system.

Each of the capillary tubes 23 and 24 is connected at its outlet end to one of the inlets respectively provided by a second pair of adsorber chambers. In the drawing, the outlet of tube 23 is connected to the inlet 25a of the chamber 25, while the outlet end of the tube 24 is connected to the inlet 26a of an adsorber chamber 26. The chambers 25 and 26 are substantially equivalent to the adsorber chambers 5 and 6, respectively, including plates 29 and 31 in the chamber 25, which plates retain a body of adsorbent material 27, and plates 30 and 32 in the chamber 26 which retain a body of adsorbent material 28. In this connection also, it is contemplated that under certain circumstances the body of adsorbent material intended to be contained in the respective adsorber chambers may be provided by means of a pre-loaded cartridge adapted for insertion and support within the chambers, wherein the upper and lower ends of the cartridge replace the retainer plate forms indicated and described.

The chambers 25 and 26 also are provided with outlets 39 and 40. In the apparatus as shown, these outlets are in free communciation with the ambient atmosphere of the structure, but where such discharge might be undesirable, the outlets may be extended to any desired area separated from the appartus itself. Under other circumstances, as where the system may be required to operate with extremely high inlet pressures, suitable back pressure regulator means may be connected with conduits 39 and 40. Likewise, where the inlet pressures may be atmospheric or below, the conduits 39 and 40 may be connected to means adapted to induce a constant flow through the system.

Whereas, in the adsorber chambers 5 and 6, heater elements 13 and 14 are shown submerged in the adsorbent material contained in the respective chambers, the adsorber chambers 25 and 26 each contain a heat sensitive element. Also as shown, these elements are submerged in the adsorbent material contained therein. For the purpose contemplated, however, namely the measurement of the heats of adsorption and desorption produced by the gas stream passed through the chambers, these elements, or equivalent means may be disposed at any other location in or beyond the beds 27 and 28. The principal requirement is that the temperature sensitive means be disposed in an area in which the temperature condition to be measured is adequately represented. In the drawings, the heat sensitive elements are designated by the numerals 33 and 34. The heat sensitive elements 33 and 34 may be any suitable element adapted either to modify an electric current passed therethrough or to generate such a current, in accordance with any temperature change induced in the adsorbent packing material contained by the respective chambers, and in the heat sensitive element. The heat sensitive elements shown in the drawing and designated by the numerals 33 and 34 therein represent a typical element for the service intended, which is known as a thermistor. This element is characterized by the fact that its resistance to passage of an electric current decreases in relation to any increase in temperature of the element and vice versa.

The thermistors 33 and 34 are disposed as opposed resistances in a bridge circuit comprising a first loop including conductor 41, the thermistor 33 and a fixed resistance 43, and a second loop of the circuit including conductor 42, the thermistor 34, and a fixed resistance 44. The bridge circuit also includes a source of D.C. voltage, such as battery 51 connected in the circuit through the respective thermistors 33 and 34, and by way of a variable resistance 52 following the fixed resistors 43 and 44. Where desired, an A.C.-D.C. converter may be substituted for the battery 51 shown. In the typical circuit shown, the thermistors each had a rated resistance of 2000 ohms at about 77° F., while the fixed resistors 43 and 44 provided a substantially constant resistance of about 3000 ohms. The resistor 52 is variable so as to permit adjustment of the bridge circuit sensitivity.

Also connected in each of the bridge circuit loops, intermediate the thermistor and fixed resistance in each loop, is a capacitor such as capacitors 61 and 62. One plate of each capacitor is connected in the bridge circuit as shown, while the other plate of each is connected in a signal circuit. The bridge circuit plates are designated in the drawing by the numerals 61a and 62a, respectively, while the signal circuit plates are designated by the numerals 61b and 62b, respectively.

A typical signal circuit system is shown by the drawing for the purpose of illustration only, and without intended specific limitation thereto. The illustrating system includes a first signal relay component 71 and a signal relay component 81. In this system, the first component comprises a galvanometer-type relay element wherein the armature 72 is the arm or blade of a double contact switch having contact points 73 and 74 connected in parallel to a conductor 75. The blade 72 itself is connected by means of a conductor 76 to one pole of a battery 77. The other pole of the battery 77 is connected by conductor 78 to the relay component 81, and with the conductor 75 also connected to the relay component 81, as shown, the circuit may be closed by contact of the blade 72 with either of the contact points 73 or 74. The blade 72 is biased so that normally it will be at rest midway between the contact points when the relay 71 is not energized. The relay 71 is energized by oscillating current flow between the plates 61b and 62b as later described. The numerals 73a and 74a designate small permanent magnets adapted to retain the switch arm 72 when contact is made thereby with the contact points 73 and 74, respectively.

The relay component 81 also provides for two switch contact points, and an armature which is a switch arm or blade. In the drawing, the switch contact points are designated by the numerals 83 and 84, and the armature switch arm by the numeral 82. The switch arm 82 is connected in a separate electric energy circuit which includes the conductor 85, connected to the switch arm substantially as shown, and the conductors 86 and 87 connected to contact points 83 and 84, respectively. In the drawing, the numeral 88 designates an alarm connected in the conductor 86, and the numeral 89 a signal light connected in the conductor 87. The conductors 85, 87, and 86 are suitably connected to a source of electrical energy, not shown.

The input constant of the signal relay component 71 of the circuit is substantially determined by the resistance characteristic of the thermistors 33 and 34. It is substantially equal to the rated resistance of the individual thermistors. Thus in the illustrative system, employing thermistors each having a resistance of 2000 ohms at 25° C., the input impedance constant of the signal relay component 71 is also about 2000 ohms. For the system here contemplated, a preferred signal relay component is one identified as a Weston Type N, having a 2000-ohm coil, which provides a full scale response to an impressed voltage of plus or minus 0.5 millivolt. Similarly, the capacitors 61 and 62 are selected with reference to the thermistor characteristic. In the system described and illustrated, each capacitor 61 and 62 preferably would have a capacitance of about 6000 microfarads.

As shown, the plates 61 and 62 are connected in the circuit with the signal relay component 71, by means including the connectors 90 and 91, so as to include an L-pad step attenuator 92 adapted to permit presentation of a constant impedance to the current flow which may oscillate between the plates 61b and 62b, while providing for attenuation of the current passed to the signal relay 71. Thus, by suitable adjustment and calibration of the attenuator 92, the signal relay component 71 can be caused to respond only to signals having a value above any selected level within the operating range of the attenuator. As an example, in a system adapted to monitor the dew point of a compressed air stream, an attenuator may be selected to provide a sensitivity for dew points between —60° F. and +50° F. with an air pressure of 100 pounds per square inch gauge.

If desired, the signal relay or alarm circuit may also be provided for connection to a recorder system (not shown). The connection means as shown includes a conductor 101, resistance 102 therein, and recorder taps 103 and 104 at opposite ends of the resistance 102. As shown, the conductor 101 is provided for connection in the signal circuit alternately to the signal relays by means of switches 105 and 106. If desired, suitable switching arrangements may be provided, whereby the recorder connection may be made in parallel with the signal relay connection.

In operation as an alarm system, a stream of the gas being monitored is drawn from the conduit 1 through the sample line 2 by way of the pressure regulator 2c. For purpose of illustration, the gas stream may be assumed to be air, having a pressure of 100 pounds per square inch gauge in the line 1, which is being monitored for its moisture content.

In the interest of equipment economy, the pressure on the sample stream is preferably reduced to a much lower value, say about 10 pounds per square inch gauge. At this lower pressure the compressed air sample stream is divided into two streams and supplied continuously and simultaneously through inlet conduits 5a and 6a to each of the respective adsorbers 5 and 6, passing through an adsorbent material therein, which material is selective for water vapor. Such a material is silica gel. Thence one stream is passed through the heat exchanger coils 21 and 23 connected to the outlet 19 of adsorber 5, while the other stream is passed through the coils 22 and 24 connected to the outlet 20 of the adsorber 6. From the coils 23 and 24, the respective streams enter the adsorbers 25 and 26 to which the coils are connected at the inlets 25a and 26a, respectively, and leave the adsorbers by their respective discharge outlets 39 and 40.

In the typical system contemplated, the adsorbers contain about 3 cubic centimeters of desiccant grade silica gel of about 20 to 40 mesh size. As the streams pass through this adsorbent material, the timing mechanism is activated to send a current through the switch mechanism and the respective heater elements 13 and 14, alternately and repetitively, for cycle periods of about one minute. Each heating element is thus energized for a heating cycle of about one minute and de-energized for a cooling cycle of about one minute. During the cooling cycle, any moisture present in the gas stream is at least partly adsorbed by the silica gel adsorbent. During the heating cycle, relatively little or no moisture is adsorbed, and that which is present, from a previous cooling cycle, is added to the stream leaving the adsorbed. In effect, the moisture content of the stream is cyclically decreased and increased by a "bunching" technique.

Of course, the effluent from the adsorbers tends alternately to exhibit an increase in temperature and a decrease in temperature as a result of the heat produced by adsorption, and the cooling effect of desorption thereon. Also, as the streams flow continuously, when the one stream is warmed the other is cooled. Inasmuch as these streams are to be analyzed for their content of the key component, water vapor, it is essential that their temperatures be substantially equalized in order to obtain determinations under substantially uniform conditions. Thus, each stream is passed through a first stage heat exchanger coil, such as the coils 21 and 22, and thence passed into indirect heat exchange relation one with another in the coils 23 and 24. In the specific operation here contemplated, the coils 21 and 22 each is a coil of 0.25 inch O.D. copper tubing wound to form a coil having thirteen turns of 1.75 inch diameter. The coils 23 and 24 are of 0.125 inch O.D. copper tubing wound to form a coil having thirty turns of 1.75 inch diameter. These coils 23 and 24 have an internal diameter of capillary dimension, whereby to set and maintain a uniform flow rate of the respective streams. The coils 23 and 24 also serve to bring the two streams to about the same temperature at the respective coil outlets through mutual indirect heat exchange.

The two gas streams now enter the analyzer or detector portion of the apparatus which comprises the adsorbers 25 and 26 by way of the inlets 25a and 26a. Each of these adsorbers also contains a small bed of silica gel which will selectively adsorb water vapor from the stream introduced into the adsorber chamber and passed therethrough.

In the operation contemplated, as the heater 13 is energized, following an adsorption cycle in the adsorber 5, the increased temperature of the bed decreases its adsorbent capacity. As a result, water vapor is desorbed to enter the air stream continuously flowing therethrough. During this cycle, therefore, the effluent from the adsorber 5 contains a greater amount of water vapor than the initial sample feed stream. The continuous sample feed stream flow aids in flushing desorbed water vapor from the adsorbent, and also quickly reduces the bed temperature when the heater element therein is de-energized.

At the same time that the heater element 13 is energized, the heater element 14 in the adsorber 6 is de-energized. With the bed temperature quickly reduced by the continuous flow feed stream, the capacity of the bed is restored, and water vapor is adsorbed from the stream. Thus, during this cycle, the effluent from the adsorber 6 contains a lesser amount of water vapor than the initial sample feed stream.

The effluent from each of the adsorbers 5 and 6, after passage through the respective series of heat exchange coils is introduced into one of the adsorbers 25 or 26, the effluent from the adsorber 5 entering adsorber 25, and that from the adsorber 6 entering the adsorber 26. Here, with the effluent from adsorber 5 containing a relatively large amount of water vapor, the temperature of the bed 27 will be increased by the heat of adsorption, and the temperature of the bed 28 will be decreased by the cooling effect of desorption therein by the relatively dry effluent from the adsorber 6. Under these conditions, the resistance of the thermistor 33 in the bed 27 will be reduced by the increased bed temperature while the resistance of the thermistor 34 in the bed 28 will increase with the decreased bed temperature. Thus, the voltage drop through that portion of the network loop which includes the conductor 41, and thermistor 33, will decrease while the voltage drop through that portion of the network loop which includes the conductor 42 and thermistor 34, will increase relative to the initial relation of the two loops in the bridge circuit. This causes the bridge circuit to become unbalanced.

When the moisture content relationship of the two streams entering the respective adsorbers 25 and 26 is reversed by action of the timer 18, the temperature relationship of the beds 27 and 28 is also reversed. This causes a reversal in the resistance of the respective thermistors 33 and 34 also, and a resulting unbalance of the bridge circuit in the opposite direction.

With continuous flow of the gas streams through the adsorbers 25 and 26, the cycling action of the timer 18 sets up an alternating or oscillating condition of voltage unbalance between the bridge loop conductors 41 and 42. The amplitude of oscillation of voltage provides a basis for measurement of the moisture content of the sample stream, when the system is suitably calibrated. With no moisture present, such oscillation does not occur.

The alternating voltage unbalance between the conductors 41 and 42 produces a corresponding charge unbalance between the respective plates of the capacitors 61 and 62. This unbalance results in turn in an oscillating current flow in the signal circuit having a voltage and amplitude directly related to the condition produced between the bridge conductors by temperature variation of the resistance characteristic of the respective thermistors 33 and 34.

The alternating voltage of the current in the signal circuit appears across the terminals of the attenuator 92. By suitable adjustment of the attenuator, the relay 71 is caused to be energized whenever the current passed through the attenuator exceeds such value. This preselected voltage value is representative of the upper limit of concentration desired in the gaseous mixture and for which the attenuator is initially designed and calibrated.

The relay 71 is adapted to be energized for maximum deflection of the arm 72 by any current flow not passed by the attenuator 91. When thus deflected, the arm 72 makes contact with one or the other of the contact points 73 or 74, and a corresponding magnet 73a or 74a, depending upon the direction of current flow between the plates 61b and 62b. This contact closes the circuit which includes the relay 81, energizing the relay to close the alarm circuit through the arm 82, contact point 83, the conductors 85 and 86, and the alarm 88. When the relay 81 is not energized, the arm 82 is restored to contact with the contact point 84, establishing an energized circuit through the conductors 85 and 87, and the signal light 89, indicating that the water vapor or other key component content of the stream entering the system through the conduit 2 is below the maximum for which the attenuator 91 has been set.

As previously indicated, the system may be adapted for use as an alarm which is responsive to any selected excess of any selected key component portion of any given gas stream. This may be accomplished by substitution in the adsorbers of a suitable adsorbent material, selective for such key component portion, and by recalibration of the system, including adjustment of the attenuator and resistance 52, to obtain the desired responses in the signal and alarm circuits.

In the system illustrated by FIG. 2, those parts and elements which correspond to parts previously illustrated by and described with reference to FIG. 1 are designated by corresponding numerals in 200 and 300 series. Thus, much of the detailed description of the purposes and functions of these elements and parts need not be repeated. The differences may be discovered in the arrangement and operation of the means for modifying the sample stream composition and for detecting the results thereof.

As shown in the drawing, the branch conduits 3 and 4 of FIG. 1 are eliminated, the conduit connection 202 communicating directly with the inlet 205a of an adsorber 205. This adsorber is packed with an adsorbent 207 disposed between upper and lower perforated retaining plates 209 and 211. A heating element 213 disposed in the bed 207 is connected to a heater circuit including primary and secondary windings 215 and 216 through a single contact on and off switch 330 actuated for intermittent connection of the heater in the circuit by means of a timer device 218.

The outlet 219 of the adsorber chamber 205 is connected, through an indirect heat exchanger 331, to the inlet 333a of an adsorber chamber 333 by way of a capillary tube 223. The numerals 335 and 337 designate inlet and outlet conduits for a heat exchange fluid supplied to the exchanger 331, for the purpose of maintaining a substantially constant temperature in the effluent supplied to the chamber 333 from the chamber 205.

The chamber 333 differs slightly from the corresponding chamber 25 of FIG. 1, in that it is provided with an enlarged inlet portion 333b, adapted to receive a temperature sensitive thermistor element 234. Otherwise, the chamber 333 compares with the chamber 25, being packed with a body of adsorbent material 227, which is held between upper and lower perforated plates 229 and 231, respectively. Also, the chamber is provided with a discharge outlet 239.

The bridge and signal circuits of the apparatus as illustrated by FIG. 2 are identical with the bridge and signal circuits illustrated by FIG. 1, with one exception. Whereas in the bridge circuit illustrated by FIG. 1, the thermistor 34 is disposed in the latter of the two corresponding chambers 33 and 34, in the arrangement according to FIG. 2, the thermistor 234 is disposed in the inlet chamber 333b of the chamber 333. In this location, the thermistor 234 is exposed to the constant temperature stream supplied by way of the capillary 223. Thus, the resistance of the thermistor 234 will have a substantially constant value, representative of the stream temperature, to provide a reference for the change of resistance produced in the thermistor 233 by the alternate adsorption and desorption of a key component fraction contained in the modulated stream derived from the chamber 205.

Operation of the apparatus as illustrated by FIG. 2, is substantially similar to that of the apparatus of FIG. 1. A sample stream is continuously passed through the conduit 202, chamber 205, heat exchanger 331 and chamber 333. The timer 218 alternately connects and disconnects the heater element 213 in the heater circuit whereby to produce cyclic and alternate heating and cooling of the chamber 205. During the cooling cycle, a key component fraction is adsorbed by the selective adsorbent 207, and desorbed during the heating cycle. As the effluent stream passes through heat exchanger 331, it is heated or cooled in indirect contact with a constant temperature fluid passed through the exchanger by way of conduits 335 and 337, and then passed through the detector chamber 333.

Due to the composition modulation produced in chamber 205, the stream as supplied to chamber 333 is alternately richer or leaner as to the key component fraction in the sample stream. Thus, the richer mixture increases the temperature of the adsorbent 227 by adsorption therein, while the leaner mixture reduces the temperature by desorptive action. The incoming stream having a substantially constant induced temperature, the resistance of thermistor 234 remains substantially constant, while the heats of adsorption and desorption produced in the adsorbent bed varies the resistance of the thermistor 233 below and above its value at the constant temperature.

As the resistance of thermistor 233 is varied, the bridge circuit reacts to develop an alternating voltage characteristic such as described with reference to FIG. 1. This alternating characteristic is transferred to the signal circuit in the same manner and with the same results as previously set forth.

What is claimed is:

1. An apparatus adapted to monitor the concentration of a key component fraction in a gaseous mixture, said apparatus comprising (1) a conduit system defining a confined flow path for a sample stream of said mixture, (2) means in said system for modulating the initial concentration of said key component fraction in said stream whereby alternately and cyclically to decrease and increase said concentration, said means including an adsorber chamber containing a body of adsorbent material which is selective for said key component fraction and including additionally means for heating said chamber in a timed repetitive on and off cycle whereby intermittently to reduce the adsorptive capacity of said contained adsorbent material, (3) electrical means for sensing the amplitude of modulation of said key component fraction below and above said initial concentration, said electrical means including a D.C. bridge circuit adapted to develop a cyclic and oscillating difference in voltage potential between two opposed points in said circuit which difference has an amplitude which corresponds with said amplitude of modulation of said initial concentration of said key component fraction in said sample stream, (4) an electrical relay circuit, including a galvanometer-type relay and means for attenuating an A.C. current in said circuit, (5) means for inducing an A.C. current in said relay circuit having an amplitude corresponding to said voltage difference, including a pair of capacitors respectively connected to one of said opposed points in said bridge circuit, and at points in said relay circuit at opposite ends thereof, and (6) an alarm actuated by said relay.

2. An apparatus according to claim 1, wherein said chamber heating means comprises an electrical heating coil disposed within said adsorber chamber so as to be imbedded in a body of adsorbent material contained thereby, and a coil energizing circuit, including a cycle timing switch adapted to energize said coil in a predetermined on-off sequence and cycle period.

References Cited in the file of this patent

UNITED STATES PATENTS

| 2,441,677 | Stallsmith | May 18, 1948 |
| 2,618,150 | Willenborg | Nov. 18, 1952 |
| 2,732,710 | Richardson | Jan. 31, 1956 |
| 2,826,908 | Skarstrom | Mar. 18, 1958 |